United States Patent [19]

Tomaiuolo

[11] Patent Number: 4,976,410
[45] Date of Patent: Dec. 11, 1990

[54] VEHICLE LOCATOR

[76] Inventor: Theodore Tomaiuolo, 114 Bohemia St., Plainville, Conn. 06062

[21] Appl. No.: 446,477

[22] Filed: Dec. 5, 1989

[51] Int. Cl.⁵ .............................................. G09F 17/00
[52] U.S. Cl. ................... 248/514; 248/539; 116/173; 40/591
[58] Field of Search ............... 248/689, 514, 534, 538, 248/539, 208, 215, 231.8; D11/166, 182; 116/28 R, 173; 40/591

[56] References Cited

U.S. PATENT DOCUMENTS

| | | | |
|---|---|---|---|
| 1,296,866 | 3/1919 | Skretting | 248/539 |
| 1,677,379 | 7/1928 | Ames | 248/538 |
| 1,744,196 | 1/1930 | Ames | 248/539 |
| 1,790,803 | 2/1931 | Francis | 248/538 |
| 2,546,280 | 3/1951 | Stein | 248/534 |
| 3,036,545 | 5/1962 | Legg | 116/28 R |
| 3,672,323 | 6/1972 | Hawes | 40/591 |
| 3,762,360 | 10/1973 | Hawes | 40/591 |
| 4,163,426 | 8/1979 | O'Neill | 40/591 |
| 4,375,134 | 3/1983 | Sheetz | 40/591 |
| 4,519,153 | 5/1985 | Moon | 40/591 |
| 4,590,883 | 5/1986 | Steed | 116/173 |
| 4,650,147 | 3/1987 | Griffin | 248/539 |

FOREIGN PATENT DOCUMENTS

| | | | |
|---|---|---|---|
| 655296 | 1/1938 | Fed. Rep. of Germany | 298/514 |
| 362005 | 8/1938 | Italy | D11/182 |
| 632617 | 11/1949 | United Kingdom | 248/538 |

Primary Examiner—Ramon O. Ramirez
Assistant Examiner—Robert A. Olson
Attorney, Agent, or Firm—Chilton, Alix & Van Kirk

[57] ABSTRACT

An aid to locating vehicles in crowded parking areas comprises a bracket which engages a vehicle side window and a flagstaff which is supported in the bracket. The angular orientation of the flagstaff relative to the bracket is adjustable without the aid of tools to place the flagstaff in a vertical orientation regardless of the vehicle body style and corresponding side window configuration.

11 Claims, 1 Drawing Sheet

VEHICLE LOCATOR

BACKGROUND OF THE INVENTION (1) Field of the Invention

The present invention relates to aids for locating vehicles in crowded parking lots and particularly to an inexpensive and easy to use mechanical device which renders the location of a parked vehicle visible from a considerable distance. Accordingly, the general objects of the present invention are to provide novel and improved devices of such character.

(2) Description of the Prior Art

The inability to quickly find one's vehicle in a crowded parking lot, for example at a sports stadium or shopping mall, is a problem which has received considerable attention. In the prior art, there have basically been two different approaches to solving this problem. The first approach includes the use of remote transmitters and vehicle mounted receivers. Upon receipt of a transmitted signal, the receiver commands the operation of an attention getting device such as a flashing light or, in some instances, the vehicle horn. These transceiver type systems are relatively expensive and have generally not performed satisfactorily in view of their susceptibility to malfunction for numerous causes, such as transmitter battery failure. Such transceiver systems are also characterized by the inconvenience of having to carry the transmitter unit and, of course, the constant need to remember to remove the transmitter unit from the vehicle.

An alternate approach to the transceiver systems briefly discussed above resides in the use of signal flags which may be raised at the time a vehicle is parked. Since the use of the vehicle's radio antenna as a flagstaff is undesirable for obvious reasons, demountable flagstaff assemblies have been proposed. These mechanical locating devices, i.e., signal flags and associated flagstaff assemblies, are typically clamped in the vehicle side window. Examples of mechanical locator devices of the type being discussed may be seen from U.S. Pat. Nos. 3,036,545, 3,672,323, 3,762,360, 4,163,426, 4,375,134, 4,519,153, 4,590,883, 4,650,147. The prior art mechanical signaling devices as exemplified by the referenced patents have been characterized by one or more inherent deficiencies. These deficiencies include mechanical complexity, and thus relatively high manufacturing costs, and a lack of adjustability so that the flagstaff can be positioned in a vertical orientation regardless of the slope of the vehicle side window.

SUMMARY OF THE INVENTION

The present invention overcomes the above-discussed and other deficiencies and disadvantages of the prior art by providing a novel and improved vehicle locating device of the type which includes a flagstaff assembly and signal flag.

The locating device of the present invention is characterized by modest cost and by the ability to easily adjust, without the use of tools, the orientation of the flagstaff relative to its supporting bracket which is engaged by the vehicle window.

In accordance with a preferred environment, the flagstaff supporting bracket of the present invention is comprised of resilient material and engages the flagstaff at two spacially displaced points. At the lower of these two points of engagement, the mounting bracket is provided with an elongated slot which extends generally away from the surface of a vehicle window which engages a mounting slot at one end of the bracket. The second, upper point of engagement of the flagstaff by the bracket functions as a pivot point. Accordingly, the angular orientation of the flagstaff relative to the window surface may be adjusted by sliding the flagstaff along the slot in the bracket while it pivots about its other point of engagement with the bracket. To ensure a tight fit, and thus to guard against any change of the angular orientation of the flagstaff by external influences such as the wind, rubber grommets are provided on the flagstaff at its points of engagement with the bracket.

BRIEF DESCRIPTION OF THE DRAWINGS

The present invention may be presently understood and its numerous objects and advantages will become apparent to those skilled in the art by reference to the accompanying drawing wherein like reference numerals refer to like elements in the several figures and in which.

DESCRIPTION OF THE DISCLOSED EMBODIMENT

Figure 1:
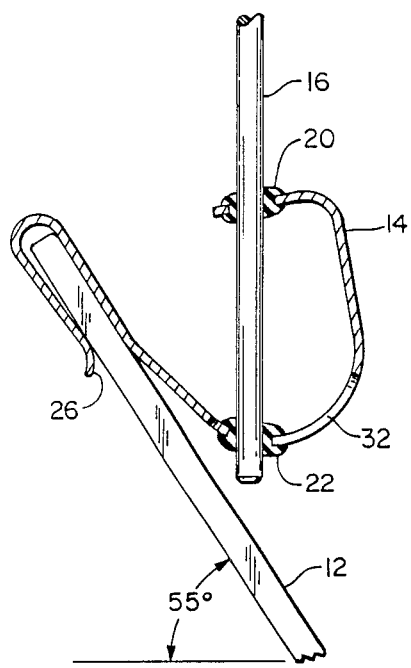
FIG. 1 is a side elevation view, partly in section, of a preferred embodiment of the present invention installed on a vehicle window.
Figure 4:
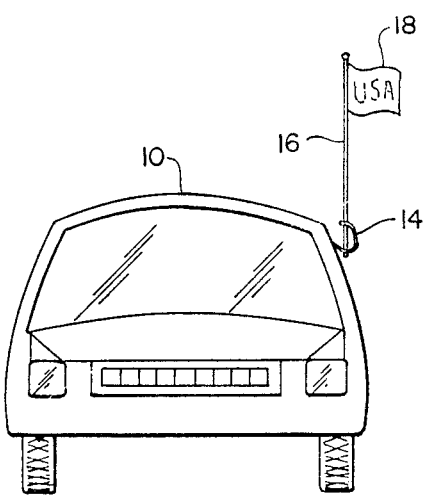
FIG. 4 is a view defecting the present invention installed on a vehicle.

With reference now to the drawing, and particularly to FIGS. 1 and 4, the side window of a vehicle 10 is indicated at 12. The window 12 extends upwardly and inwardly at an angle with respect to the vertical, this angle being determined by the body styling of the vehicle. A warning device in accordance with the present invention is intended to be engaged by the window 12 as shown and clamped between the window and the upper portion of the vehicle window frame. This device comprises a bracket 14, a flagstaff 16, a flag 18 and a pair of grommets 20 and 22. The flag 18 may be attached to the flagstaff 16 in any suitable manner and may be rigid or comprised of a flexible material, i.e., cloth or a suitable plastic. If the locating device of the present invention is employed as a premium, i.e., is distributed by a commercial endeavor to its customers, flag 18 would typically bear an advertising message.

Figure 3:
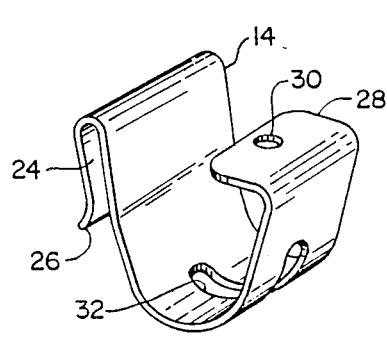
FIG. 3 is a perspective view of the bracket of the embodiment of FIGS. 1 and 2.

The bracket 14, as may best be seen from FIG. 3, is shaped to define a window glass engaging recess 24 at a first end thereof. The bracket 14 is fabricated from a material having a degree of resiliency and the folded over tab end which defines the recess 24 is, from the base of the recess, directed inwardly and then bent outwardly. The length of the recess 24 is at least 50% of the width of bracket 14. The bracket thus functions in the manner of a spring clip with the window glass being guided into the recess 24 by the outwardly flared and rounded end at 26. The bracket 14 may be comprised of plastic or metal. The bracket 14 will, if formed from metal, be coated with plastic or a durable paint to ensure against scratching of the window glass.

Continuing to discuss the bracket 14, the end thereof oppositely disposed with respect to the outwardly flared lip 26 extends generally toward the base of the window engaging recess 24 to define an apertured platform 28. The platform 28 is provided with a through-hole 30 which receives a grommet 20. The hole 30 is undersized relative to the diameter of the base of the slot in grommet 20 which is engaged by the platform 28. Accordingly, the grommet will be in a compressed state when installed, i.e., the through-hole in the grommet will be reduced relative to its size when in the free, uninstalled condition. The diameter of the flagstaff 16, however, is chosen to be commensurate with the diameter of the hole in grommet 20 when in its uncompressed state.

The bracket 14 is also provided with a slot 32 which is generally aligned with, but vertically displaced from, the hole 30 as shown. The width of slot 32 is the same as the diameter of hole 30. A second grommet 22, which is identical to grommet 20, is installed in slot 32. When the locator device is assembled, the flagstaff 16 extends through both of grommets 20 and 22.

In order to ensure stable mounting, the bracket 14 is shaped such that the outside of the portion thereof which forms the recess 24 is flat and will thus engage the outside surface of a window at least to the end of the recess 24. Thereafter, the bracket is flared outwardly to the region of the beginning of the slot 32. The region of the bracket which encompasses the slot 32 is of generally arcuate shape and the opposite ends of the slot 32 are thus generally at the same elevation. From the region of the outwardly disposed end of slot 32, the bracket continues to extend upwardly until it joins with the platform 28.

The flagstaff 16 is formed of an suitable material such as, for example, a plastic rod or wooden dowel. Although not essential, assembly of the locating device is facilitated by shaping the lower end of the flagstaff 16 as shown to facilitate its passage through the grommets 20 and 22.

Figure 2:
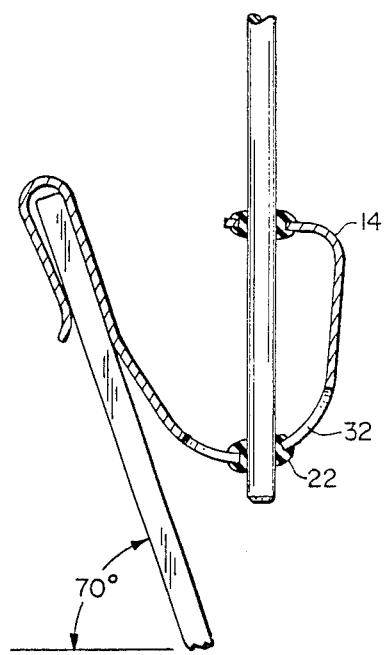
FIG. 2 is a view similar to FIG. 1, but with the invention being installed on a window having a different angular orientation when compared to the window in FIG. 1.

Through a comparison of FIGS. 1 and 2, it may be seen how the locating device of the present invention can easily be re-adjusted as a function of the vehicle styling so that the flagstaff 16 can always be placed in a vertical orientation. During adjustment of the orientation of the flagstaff, the lower grommet 22 is caused to slide along the slot 32. As the grommet 32 slides the flagstaff will pivot about its point of capture by the upper grommet 20 and, to some extent, the bracket itself will flex because of its inherent resiliency. The undersizing of the hole 30 and width of slot 32 relative to the grommets eliminates slippage of the flagstaff even in a strong gusty wind. Thus, once the angular orientation of the flagstaff has been set, the flagstaff will remain in this orientation.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. An adjustable signal device comprising:
   mounting bracket means, said bracket means having first and second oppositely disposed and spacially displaced ends, said bracket means including:
   retaining means for affixing said first end of said bracket means to an object;
   a first flagstaff receiving aperture in said bracket means adjacent the said second end thereof; and
   an elongated slot in said bracket means intermediate said first and second ends thereof, said slot being at least in part in registration with said aperture whereby a flagstaff may simultaneously extend through said aperture and slot;
   a first grommet installed in said first aperture, said first grommet being comprised of a resilient material and being sized relative to the said aperture hole so as to be in compression;
   a second grommet installed in said slot, said second grommet being sized relative to said slot so as to be in compression, said second grommet being slidable along said slot; and
   a flagstaff extending through said first and second grommets and being securely engaged thereby, said flagstaff pivoting about its region of engagement by said first grommet when said second grommet slides along said slot.

2. The apparatus of claim 1 wherein said bracket means extends generally outwardly from said retaining means to at least the end of said slot and extends generally upwardly from the region of said slot to the region of said aperture.

3. The apparatus of claim 1 wherein said bracket means is comprised of a resilient material and said retaining means is an end portion of said bracket means which is folded on itself to define a generally downwardly facing recess, the base of said recess defining a line.

4. The apparatus of claim 3 wherein said bracket means extends generally outwardly from said retaining means to at least the end of said slot and extends generally upwardly from the region of said slot to the region of said aperture.

5. The apparatus of claim 3 wherein said retaining means defined recess has a portion of reduced width intermediate its length whereby said retaining means functions as a spring clip.

6. The apparatus of claim 3 wherein said resilient material comprises metal and wherein said apparatus further comprises a protective coating on said bracket means.

7. The apparatus of claim 3 wherein said bracket means has a width and wherein said bracket means defined recess has a length which is greater than 50% of said bracket means width, said recess also having a portion of reduced width intermediate its length whereby said retaining means functions as a spring clip.

8. The apparatus of claim 7 wherein said bracket means has a first portion which extends generally outwardly from said retaining means, a second portion which extends generally upwardly from the most outwardly disposed end of said first portion, and a third portion which extends generally inwardly toward said retaining means from said second portion, said slot being in said first portion and said aperture being in said third portion.

9. The apparatus of claim 1 wherein said bracket means has a first portion which extends generally outwardly from said retaining means, a second portion which extends generally upwardly from the most outwardly disposed end of said first portion, and a third portion which extends generally inwardly toward said retaining means from said second portion, said slot being in said first portion and said aperture being in said third portion.

10. The apparatus of claim 9 wherein said bracket means is comprised of a resilient material and said retaining means is an end portion of said bracket means which is folded on itself to define a generally downwardly facing recess.

11. The apparatus of claim 9 where ink said retaining means defined recess has a portion of reduced width intermediate its length whereby said retaining means functions as a spring clip.

* * * * *

UNITED STATES PATENT AND TRADEMARK OFFICE
CERTIFICATE OF CORRECTION

PATENT NO. : 4,976,410

DATED : December 11, 1990

INVENTOR(S) : Theodore Tomaiuolo

It is certified that error appears in the above-identified patent and that said Letters Patent is hereby corrected as shown below:

Claim 1, column 4, line 11, delete "hole".

Claim 11, column 5, line 6 "where ink" should be changed to --wherein--.

Signed and Sealed this

Eleventh Day of August, 1992

Attest:

DOUGLAS B. COMER

Attesting Officer

Acting Commissioner of Patents and Trademarks